Patented Mar. 26, 1929.

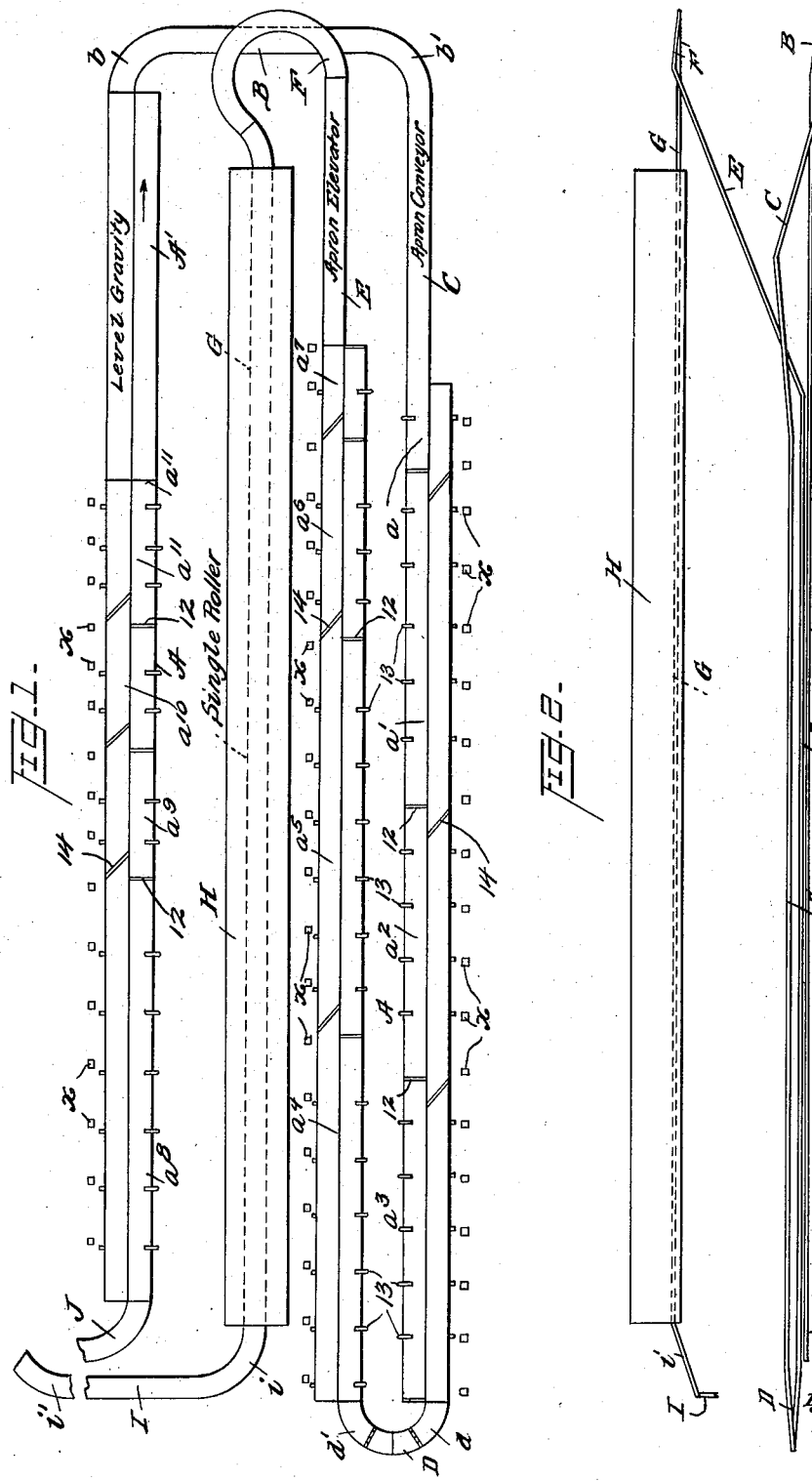

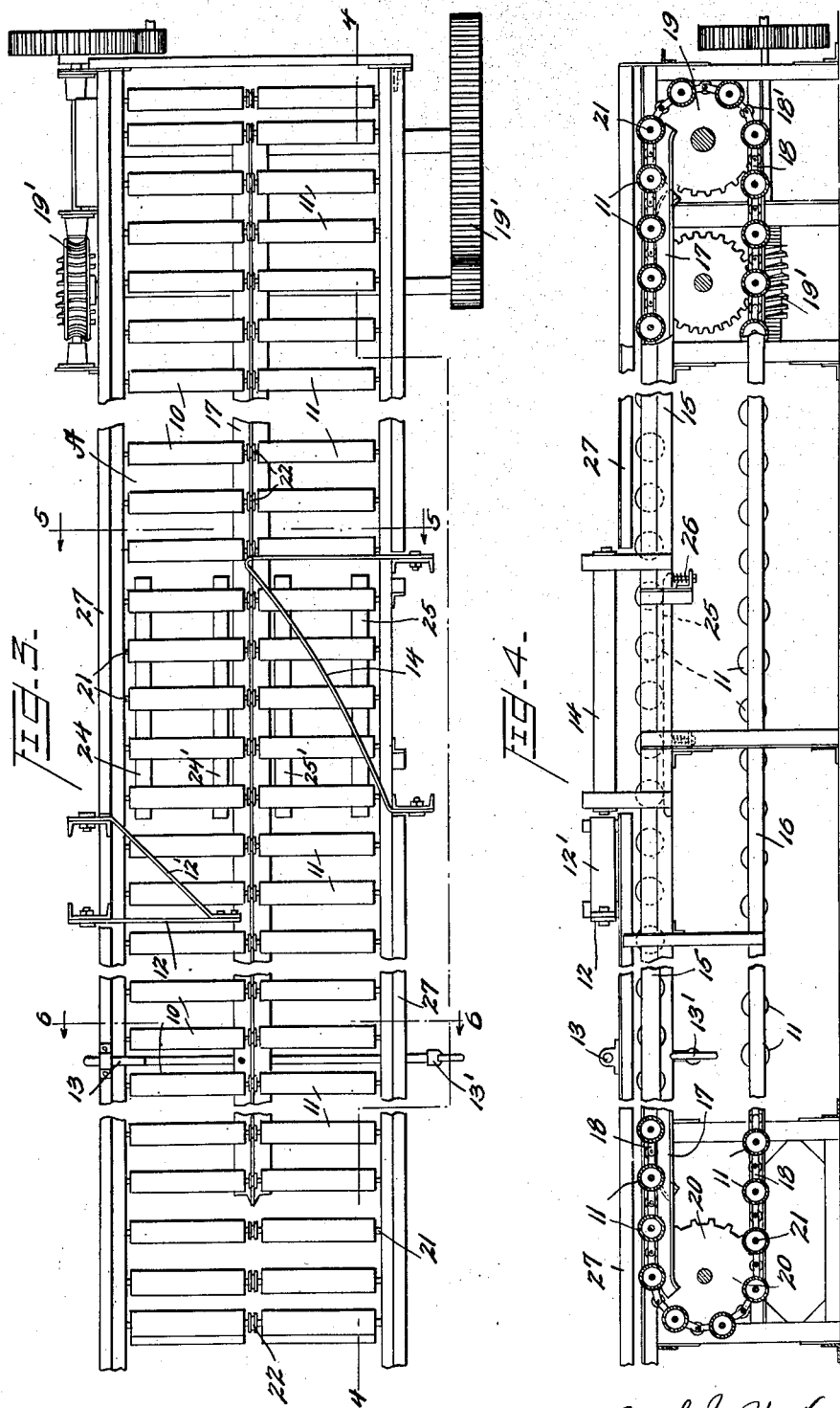

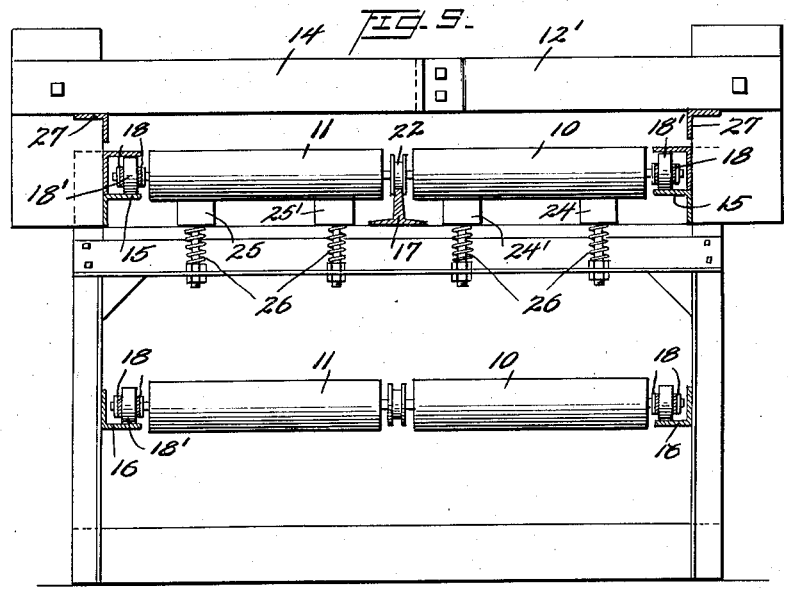
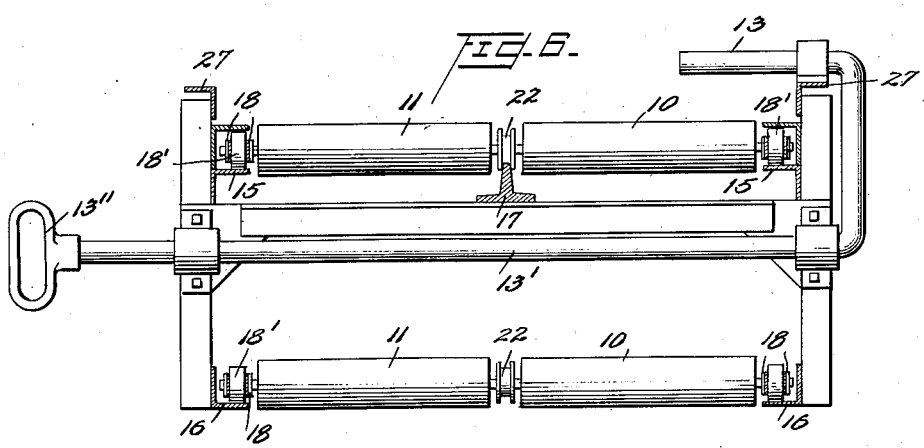
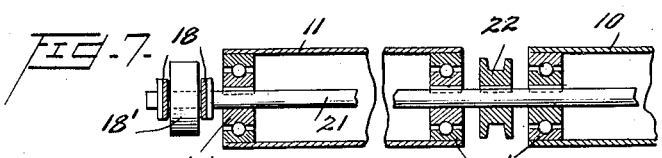
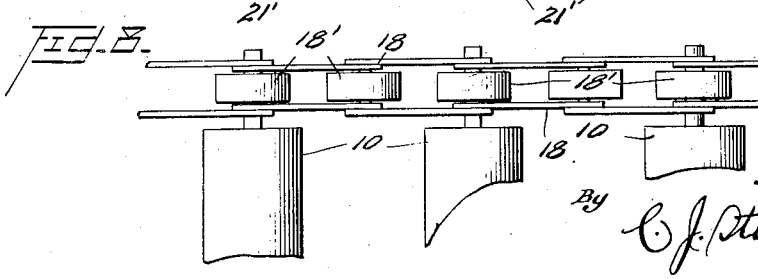

1,706,437

UNITED STATES PATENT OFFICE.

MORRIS U. BURNHAM, OF CINCINNATI, OHIO, AND GEORGE M. ARGABRITE AND ARTHUR A. DIONNE, OF CHICAGO, ILLINOIS, ASSIGNORS TO THE ALVEY-FERGUSON COMPANY, OF CINCINNATI, OHIO, A CORPORATION OF OHIO.

CONVEYING MECHANISM.

Application filed June 7, 1924. Serial No. 718,661.

This invention generally comprises a conveyer having a plurality of beds co-operating to transfer the packages or other things conveyed—hereinafter called "work"—from one end of the conveyor to the other and relatively so arranged that the work will be automatically transferred from one bed to the other at one or more places in the length of the conveyor. More particularly defined, it comprises a conveyor having a plurality of suitable work supporting beds arranged side by side and so related to each other that the work may be removed from one bed at one or more stations or places in the length thereof and may later be returned to said bed, at a different station or place in the length of the conveyor, when placed on the other bed.

In a general way, the invention may be set forth as providing a conveyor having important advantages due to a novel correlation of parts, including a plurality of beds, arranged side by side, each formed of traveling rollers, together with one or more stops and one or more diverting elements, as hereinafter more particularly set forth, although, in its broadest aspects, not confined to such particular parts. The invention also includes a system which comprises a plurality of said conveyors arranged in co-operative relation with other conveyors of type, kind or construction appropriate to the particular location and use to which the system is to be put.

The conveyor or system may be beneficially used in the manufacture of an article whose production involves a series of operations or manipulations, respectively performed by different operatives stationed alongside the conveyor or system, the parts being so correlated that the work will be conveyed from one work station to another, in such relation to one or more operatives at said stations that each operative without leaving his position may remove the work from one of the beds, perform his operation thereon, and then place the work on the other bed by which it will be automatically returned to the first mentioned bed at a place in the length thereof further along from the one at which he removed it.

One of the beneficial applications of the present mechanism or system, in its entirety as here illustrated, is in the manufacture of shoes, and, indeed, it is one of the important purposes of this invention to provide for shoe manufacturers a conveying mechanism of practicable construction whose use will result in very important economies in the production of their shoes.

We have, therefore, illustrated a conveying system particularly intended for shoe manufacturers but we would have it understood that to a very substantial extent this is exemplary as the invention is capable of beneficial use in other lines of manufacture.

In the accompanying drawings, illustrating the preferred embodiment of the invention, and wherein like characters or reference designate corresponding parts in the several views:—

Fig. 1 is a diagrammatic representation of a conveying mechanism or system of conveyors, embodying our improvements, viewed from above, Fig. 2 is a diagrammatic representation of a part of said mechanism or system viewed from one side, Fig. 3 is a plan view of one of the conveyors broken off at different places along its length, Fig. 4 is a side elevation of the same, Figs. 5 and 6 are transverse sections on the lines 5—5 and 6—6 of Fig. 3, viewed in the directions of the arrows, respectively, Figs. 7 and 8 are detail views of parts of the traveling beds of this conveyor.

A designates a conveyor which comprises two separate but co-operating traveling members arranged side by side and moving simultaneously and at the same speed, and each having traveling rollers, forming the beds by which the work is conveyed. The rollers of one of said beds are marked 10 and the rollers of the other bed are marked 11. The work is transferred by the co-operating action of the two lines of rollers to operatives who stand alongside the line of rollers 11, these two lines being so correlated that each operative may reach across the line formed of the rollers 11 and remove the work from the line formed of the rollers 10 and then after performing his operation on the work place the latter on the line of rollers 11 by which it will be returned to the line of rollers 10, in the manner hereinafter set forth. The beds composed of the two lines of rollers 10 and 11 are preferably of equal length and arranged side by side throughout their entire lengths.

The conveyor A is provided with one or more stops 12, each preferably braced by an arm 12'. Each stop 12 is co-operatively related with the line of rollers 10 and operates to stop the progress of any articles which has been brought into contact therewith by the rollers 10 upon which the article rests, each roller 10 in turn rolling from beneath said article with a minimum of friction. The stops 12 define the spaces from within which the work may be removed from the line of rollers 10 and assure when necessary the stoppage of the travel and, in case of need, accumulation of the work within said spaces until an operative is ready for said work.

Switching stations are provided at suitable places intermediate the length of the conveyor. Each switching station is provided with a suitable diverter, here shown as a switch rail 14 extending diagonally across the line of rollers 11 at a place suitably rearward of the vertical plane of the corresponding stop 12. At each switching station means (such, for example, as those hereinafter described) are provided to cause a positive and simultaneous rotation of the rollers 10 and 11 while passing through these stations, to assure the transfer of the work along the line of the diverter 14 from the rollers 11 and the settling of the work upon the rollers 10 for further movement along the latter line of rollers.

In practice, a plurality of these conveyors A are employed as indicated in the diagrammatic view of Fig. 1. The number and relative locations of these conveyors and also the number and relative locations of the several work stations served by the conveyors, of course, will depend upon the requirements of the particular installation and will vary according to such requirement. In the diagrammatic view, however, three conveyors A are shown and these conveyors are illustrated, for exemplary purposes as having twelve sections designated $a$—$a^{11}$, respectively, each corresponding to a work station. As indicated in Fig. 1 by the reference letters $x$, several operatives are stationed along the length of each work station and each of said operatives has under his control a movable stop 13. Each of these stops is preferably mounted to be slidable into and out of the path of the work or rollers 10. The means preferably employed for thus moving each stop is shown best in Fig. 6 and comprises an operating arm 13' extending across the conveyor beneath the rollers 10 and 11 and having a handle 13" at its free end adjacent the operative who has it under his control.

Each conveyor A, of course, is provided with a frame which may be of any suitable construction. The means for carrying the rollers and imparting traveling movement thereto are of endless traveling nature, preferably chains 18 having supporting rollers 18' and engaging power driven sprockets 19 at one end of the frame and other sprockets 20 at the other end of the frame. The frame is provided with a pair of upper tracks 15 and a pair of lower tracks 16 and also with a track 17 between the upper tracks 15. These tracks are supported in their elevated positions by suitable frame elements not necessary herein particularly to describe. The tracks extend longitudinally of the frame. The endless travelers, 18, are arranged at opposite sides of the frame and their rollers 18' traverse the upper tracks 15 in the working runs of the travelers and the lower tracks 16 in the returning runs of said travelers. The means for driving the sprockets 19, indicated generally at 19', Figs. 3 and 4, is of any suitable kind, preferably of the type which also provides for the taking up of slack in the chains. It is not necessary to describe these means in detail.

The chains are connected with each other by transverse shafts 21 upon each of which a roller 10 and a roller 11 are loosely mounted, preferably upon ball bearings, as indicated at 21'. These rollers are arranged at opposite ends of the shaft 21 with a space between their confronting ends and in said space a wheel 22 is fixed to the shaft and traverses the track 17. Thus, it will be seen that the rollers 10 and 11 forming the two traveling beds hereinbefore referred to are mounted upon shafts common thereto and which shafts are supported at their ends and also at places intermediate their ends, so that all tendency to warping or bending of the rollers 10, 11 or binding of the chains on the tracks even under heavy usage, is overcome.

The preferred means at each of the switching stations to cause a positive rotation of the rollers 10 and 11 about their shafts 21 while passing through these stations, shown best in Fig. 5, comprising a pair of longitudinal flat rails 24, 24' arranged to engage the under surfaces of the rollers 10, near the opposite ends of said rollers, and a like pair of rails 25, 25' to engage the under surfaces of the rollers 11. Each of these rails is pressed toward the rollers by a spring 26 to insure an effective and yet yieldable engagement between them and the rollers. It will be evident that as the rollers travel along these rails they will be caused thereby to rotate in a forward direction upon their shafts 21 and by their rotation will impose pressure on the under surface of the article or work being conveyed sufficient to cause the latter to move in a forward direction along the diagonal line defined by the diverter 14. In this movement, the rollers 11 and 10 and the diverter 14 co-operate to transfer the article or work from the rollers 11 to the rollers 10. Guards, as rails 27, for example, may be provided at the switching stations, or wherever necessary or desirable along the length of the conveyor, to insure the straightening of work or articles at the switching stations and their movement in a straight forward direction with the rollers 10 after they have been transferred to the latter rollers at the switching stations.

In Figs. 1 and 2, we have illustrated a series of these conveyors A arranged in substantially parallel lines and having their lines of rollers 10 connected with each other by other conveyors of conveying sections of appropriate nature, the correlation of parts being such as to form a conveying system by whose use work may be started at a particular station—the conveying section A', for example—and make a complete circuit back to said conveying section A': and in its said progress the work may be subjected at the various work stations of the conveyors A to the various operations by which it is produced as a finished article.

The illustrated system is particularly intended for use in a highly organized shoe factory. In a modern shoe manufacturing establishment there are a multiplicity of operations, each performed by a separate workman with the aid of an appropriate machine. It is not necessary to set forth these different operations, it being sufficient to state that they start with the tacking of the insole, and that at an appropriate time in the production of the shoe, it is subjected to the action of a drier H. The various elements of the illustrated system in the order of their arrangements, is as follows:

By the conveyor or conveying section A' which is arranged adjacent bins containing the lasts and the uppers, and is preferably of a gravity nature, the work is conveyed to a curved gravity section $b$ from which a section B, of gravity or other suitable nature, extends to a gravity section $b'$ having a curvature opposite that of the section $b$: this gravity section $b'$ extends to conveyor or section C which is preferably a traveling apron, and this in turn delivers the work to the line of rollers 10 of a conveyor A at the station $a$ of the latter: from the work station $a^3$ at discharging end of said conveyor A, a conveyor D, (preferably gravity) comprising oppositely curved gravity section $d$, $d'$ extends to the work station $a^4$ at the receiving end of the next conveyor A and from the work station $a^7$ at discharging end of the latter conveyor A an upwardly inclined elevator E, preferably of the traveling apron type, extends to a curved gravity section F at a higher level, this gravity section in turn extending to a conveyor or section G which is preferably of the endless-traveling roller-bed type and which travels through the driver H. The discharge end of the latter conveyor or section communicates with a gravity section $i$ which in turn communicates with a downwardly inclined lowering conveyor or section I preferably of the traveling apron type, and delivers the work to another curved gravity section $i'$.

From the latter gravity section, the system may include any appropriate number and arrangement of other conveyors A connected by suitable conveying sections and terminating in a section J which is in operative relation with the said first conveyor A at the work station $a^9$ of the latter.

It will be understood as before set forth that at each work station of each conveyor A there is an appropriate number of operatives and machines for carrying out the various operations in the progress of the work from and back to and throughout the last named conveyor, these machines and operatives being located along the lines of rollers 11.

The work is placed in racks, several shoes to each rack, at the starting station, and is carried throughout the system of conveyors in these racks. As a rack reaches a position on the line of rollers 10 adjacent a workman, he removes the rack with its contents from said rollers, performs his operation or operations on the shoes therein and then replaces the work in the rack and places the latter on the rollers 11 which carries the rack with its contents onward, to be transferred back to the rollers 10 at the next switching station, or directly to another conveying section, as the case may be. In their progress, the racks are automatically discharged from one conveyor or conveyor section to another and at an appropriate place in their travel are automatically elevated and thence conveyed through an elevated drier suspended from the ceiling and then lowered back to the previous level where further operations are carried on, including the operations of withdrawing the lasts from the almost completed shoes and, if desirable, the packing of the shoes for the market.

The work is, therefore, carried on continuously and in a most economical way. In fact, experience has shown remarkable increase in production of shoes and savings in the cost thereof brought about by the use of this conveying system. Each conveyor A is positive in action, smooth in carrying motion, automatic, fool proof and accident proof. The means for conveying the racks with the unfinished shoes up to and through the drier assures a jarless, easy and positive motion to the shoes through the drying operation and allows for variations to increase or decrease the drying period. Proper drying of the incomplete shoes is an important step and the use of this system has established the fact that shoes are completely and beneficially dried by the means herein set forth. The heating means should be so arranged as to gradually increase the temperature of the drying chamber from the entrance end of said chamber to the exit end thereof, whereby danger of the burning of the leather is avoided. The length of time required in the drying operation is much less than that hitherto deemed necessary. The drying chamber is preferably electrically heated but may be heated by steam, if desired, and in any case, it is advisable to provide the drier with means to humidify or otherwise assure that the air within the drier will contain sufficient humidity to avoid all danger of cracking of the leather.

In practice, the use of this conveying system in the manufacture of shoes results also in marked economy in the number of lasts which must be provided, as well as in the number of workmen, and in the time required in the production of a given number of shoes per day.

It will be apparent that any one or all of the conveyors A may be arranged either horizontally or at an upward inclination, as desired, and that any one of them may embody one or more upwardly inclined sections and one or more horizontal sections. In the case of a conveyor which is upwardly inclined throughout its length or has one or more inclined sections within its length rotative movement imparted to the forwardly traveling rollers will enable them to carry the articles resting thereon up the incline.

Having thus described our invention what we believe to be new and desire to secure by Letters Patent, is:—

1. A conveyor having a traveling conveying member, a second member for the transfer and storage of work, having stops in a spaced relation along its length, and means operatively related to said members to guide work from the first named member to the second member at one or more places between the stops.

2. A conveyor comprising a plurality of endless traveling beds arranged in substantial parallelism, means by which articles placed on one bed will be automatically transferred to the other and a stop operatively related to the latter bed and arranged in advance of the place where the transfer is to be effected.

3. A conveyor comprising a plurality of endless traveling beds arranged in substantial parallelism, and means by which articles placed on one bed will be automatically transferred to the other and a plurality of stops operatively related to the latter bed and respectively arranged on opposite sides of the places where the transfer is to be effected.

4. A conveyor comprising a plurality of endless traveling beds, co-operating in the transfer of articles from one end of the conveyor to the other, said beds being arranged in substantial parallelism and the conveyor having a stop operatively related to one bed and a switching element operatively related to the other bed, the operative relationship between the stop and switching element and the beds being such that articles placed on one bed will be automatically transferred to the other bed and may be stopped on the latter.

5. A conveyor comprising a plurality of beds arranged side by side in substantial parallelism with each other and traveling at substantially the same speed and in the same direction, a stop operatively related to one of the beds and a diverting element operatively related to the other bed to guide the work therefrom toward the first named bed.

6. A conveyor comprising a plurality of beds arranged side by side in substantial parallelism with each other and traveling at substantially the same speed and in the same direction, a plurality of stops operatively related to one of the beds and a diverting element operatively related to the other bed at a place between said stops to guide the work therefrom toward the first named bed.

7. A conveyor comprising a line of forwardly traveling rotative members forming a work supporting bed, a second line of forwardly traveling rotative members forming a second work supporting bed and co-operating means operatively related to said beds to cause the transfer of articles from one bed to the other, said means including a member to cause rotation of the forwardly traveling rotative members in effecting the transfer.

8. A conveyor comprising a line of forwardly traveling rotative members forming a work supporting bed, a second line of forwardly traveling rotative members forming a second work supporting bed, a stop arranged in the path of the article conveyed by the first bed to bar the progress of said article thereon and co-operating means operatively related to said beds to cause the transfer of articles from the second bed to the first bed, said means including a member to cause rotation of the forwardly traveling rotative members in effecting the transfer.

9. A conveyor comprising endless traveling elements, transverse shafts connecting said elements, a line of rollers mounted on one end of the respective shafts and conjointly forming a work supporting bed, a second line of rollers mounted on the other ends of the respective shafts and conjointly forming a second work supporting bed, and means co-operating with the rollers of both lines to cause the transfer of articles from one bed to the other.

10. A conveyor comprising endless traveling elements, transverse shafts connecting said elements, a pair of rollers at opposite ends of each shaft, means co-operating with said rollers to cause the transfer of articles from one line of rollers to the other, and a stop operatively related to the latter line of rollers.

11. A conveyor comprising endless traveling elements, transverse shafts connecting said elements, a pair of rollers at opposite ends of each shaft, said rollers conjointly forming two separate work supporting beds arranged one beside the other, means to engage the rollers of both beds and cause them to rotate, and a diverter operatively related to the rollers adjacent said means and co-operating therewith to cause the transfer of articles from one bed to the other.

12. A conveyor comprising endless traveling elements, transverse shafts connecting said elements, a pair of rollers at opposite ends of each shaft, said rollers conjointly forming two separate work supporting beds arranged one beside the other, means yieldably pressed toward the rollers of both beds and engaging the same to cause them to rotate, and a diverter operatively related to the rollers adjacent said means and co-operating therewith to cause the transfer of articles from one bed to the other.

13. A conveyor comprising a frame having upper and lower tracks, endless traveling elements at opposite sides of the frame, each traversing the upper and lower tracks, transverse shafts connecting said elements with each other, a pair of rollers rotatably mounted on each shaft at opposite ends thereof, said rollers conjointly forming two separate work supporting beds arranged one beside the other, and means co-operating with the rollers to transfer work from the line of rollers forming one bed to the line of rollers forming the other bed, automatically.

14. A conveyor comprising a frame having a pair of upper tracks at its opposite sides, a pair of tracks, respectively, below the upper tracks, and an upper track intermediate the said upper tracks; endless traversing elements traversing the said pairs of upper and lower tracks, transverse shafts connecting said elements with each other, a pair of rollers mounted on each shaft, at opposite ends thereof, said rollers conjointly forming two separate work supporting beds arranged one beside the other, and a rotative element mounted on each shaft between the confronting ends of the rollers and traversing the intermediate upper track.

15. A conveyor comprising a frame having a pair of upper tracks at its opposite sides, a pair of tracks, respectively below the upper tracks, and an upper track intermediate the said upper tracks; endless traversing elements traversing the said pairs of upper and lower tracks, transverse shafts connecting said elements with each other, a pair of rollers mounted on each shaft, at opposite ends thereof, a rotative element mounted on each shaft between the confronting ends of the rollers and traversing the intermediate upper track, and means co-operating with the rollers to transfer work from one line of rollers to the other.

16. A conveyor comprising endless traveling elements, transverse shafts connecting said elements, a pair of rollers at opposite ends of each shaft, means to engage the rollers and cause them to rotate, a diverter co-operating with the rollers to cause the transfer of articles from one line of rollers to the other, and a stop operatively related to the latter line of rollers.

17. A conveyor comprising endless traveling elements, transverse shafts connecting said elements, a pair of rollers at opposite ends of each shaft, means yieldably pressed toward the rollers and engaging the same to cause them to rotate, a diverter co-operating with the rollers to cause the transfer of articles from one line of rollers to the other, and a stop operatively related to the latter line of rollers.

18. A conveyor comprising a plurality of work-conveying beds which travel in the same direction and are arranged in close contiguity one beside the other and having means to cause the transfer of the work directly from one bed to the other at a predetermined place intermediate the length of both beds and a stop adjustable at will into and out of the path of the work on the latter bed.

19. A conveyor comprising a plurality of beds which travel in the same direction and are arranged in close contiguity one beside the other and each of which is provided with traveling work-conveying rollers, a diverter operatively related to one bed to guide the work therefrom directly to the other bed at a place intermediate the length of the latter bed, and a stop adjustable at will into and out of the path of the work on said latter bed.

20. A conveyor comprising a plurality of work-conveying beds arranged side by side and having means to cause the transfer of the work from one bed to the other, a fixed stop operatively related to one bed and a stop adjustable at will into and out of the path of the work on the latter bed.

21. A conveyor comprising a plurality of work-conveying beds arranged side by side, a plurality of stops operatively related to one bed, one of said stops being adjustable at will into and out of the path of the work on said bed, and a diverter operatively related to the other bed to guide the work therefrom toward the bed having the stops.

22. A conveyor comprising a plurality of beds arranged side by side and each provided with traveling work-supporting rollers, a plurality of stops operatively related to one bed, one of said stops being adjustable at will into and out of the path of the work on said bed, and a diverter operatively related to the other bed to guide the work therefrom toward the bed having the stops.

23. A conveyor comprising a plurality of beds each provided with traveling work conveying rollers, a diverter operatively related to one bed to guide the work therefrom to the other bed, a fixed stop operatively related to the latter bed, and a stop adjustable at will into and out of the path of the work on said latter bed.

24. A conveyor comprising a plurality of beds arranged side by side and each composed of traveling rotatively mounted work-supporting members, means intermediate the length of said members to cause rotation of said members while traveling thereover, a diverter operatively related to the portions of the beds traversing said means to co-operate therewith in causing transfer of the work from one bed to the other, and a stop operatively related to a portion of one of the beds which is not traversing said means.

25. A conveyor comprising a plurality of beds arranged side by side and each composed of traveling rotatively mounted work-supporting members, means intermediate the length of said members to cause rotation of said members while traveling thereover, a diverter operatively related to the portions of the beds traversing said means to co-operate therewith in causing transfer of the work from one bed to the other, and a plurality of stops operatively related to a portion of one of the beds which is not traversing said means, one of said stops being adjustable into and out of the path of the work on said portion of the bed.

26. A conveyor comprising a plurality of endless traveling beds arranged side by side and each having rotatively-mounted work-supporting members throughout its length, means arranged at intervals along the length of the conveyor to cause said members to rotate while traveling thereover, and a diverter operatively related to the members adjacent each of said means to co-operate therewith in transferring the work from one bed to the other.

27. A conveyor comprising a plurality of endless traveling beds arranged side by side and each having rotatively-mounted work-supported members throughout its length, means arranged at intervals along the length of the conveyor to cause said members to rotate while traveling thereover, a diverter operatively related to the members adjacent each of said means to co-operate therewith in transferring the work from one bed to the other and a stop operatively related to one of the beds at a place unprovided with said means.

28. A conveyor comprising a plurality of endless traveling beds arranged side by side and each having rotatively-mounted work-supporting members throughout its length, means arranged at intervals along the length of the conveyor to cause said members to rotate while traveling thereover, a diverter operatively related to the members adjacent each of said means to co-operate therewith in transferring the work from one bed to the other and a stop operatively related to one of the beds at a place unprovided with said means, one of said stops being adjustable at will into and out of the path of the work on said portion.

29. A conveyor comprising a plurality of endless traveling beds arranged side by side and each having rotatively-mounted work-supporting members throughout its length, means arranged at intervals along the length of the conveyor to cause said members to rotate while traveling thereover, a diverter operatively related to the members adjacent each of said means to co-operate therewith in transferring the work from one bed to the other, and a stop operatively related to one of the beds at a place unprovided with said means, one of said stops being adjustable at will into and out of the path of the work on said portion, and the other fixed in the path of said work on said portion.

30. A conveyor comprising a plurality of traveling work-supporting beds arranged side by side and having intermediate its length a diverter co-operating with said beds to cause the work to be transferred from one bed to the other, and stops arranged at different places along the length of the conveyor and defining separate work spaces.

31. A conveyor comprising a plurality of traveling work-supporting beds arranged side by side and having a switching station intermediate its length for transferring the work from one bed to the other and also having stops at different work stations along the length of the conveyor.

32. A conveyor comprising a plurality of traveling beds arranged side by side and each provided with rotatively mounted work-supporting members, the conveyor having, intermediate its length, a diverter and means for causing rotation of said members, to provide a switching station at which the work is transferred automatically from one bed to the other, and a plurality of stops defining different work spaces at places in the length of the conveyor other than at the switching station.

33. A conveying mechanism comprising a conveyor having an endless traveling conveying line and a second traveling conveying line, means operatively related to said lines to transfer work from the second line directly to the first named line at different places in the length of the first named line, conveying means to deliver the work to said conveyor, and conveying means to carry the work away from said conveyor.

34. A conveying mechanism comprising a conveyor having an endless traveling conveying line and a second traveling conveying line, the said lines arranged side by side throughout their lengths, means operatively related to said lines to transfer work from the second line to the first named line at different places in the length of the first named line, conveying means to deliver the work to said conveyor, and conveying means to carry the work away from said conveyor.

35. A conveying mechanism comprising a conveyor having an endless traveling conveying line and a second traveling conveying line, means operatively related to said lines to transfer work directly from the second line to the first named line at different places in the length of the first named line, conveying means to deliver the work to said conveyor, and conveying means to carry the work away from said conveyor, the latter means including an upwardly inclined section to carry the work to a higher level, and a conveying section at a higher level.

36. A conveyor comprising two separate lines of traveling rollers, each line forming a work supporting bed, and elements forming switching stations at intervals along the length of the conveyor, each switching station comprising a means to cause axial rotation of the rollers in their passage through the station and a diverter co-operating with said means and rollers to cause the work in said station to be transferred automatically from one line of rollers to the other.

37. A conveyor comprising two separate lines of traveling rollers forming a first and a second work supporting bed, stops arranged at intervals along the length of the conveyor in position to bar the progress of the work carried by the first bed, and elements forming switching stations at intervals along the length of the conveyor, each switching station comprising a means to cause axial rotation of the rollers in their passage through the station and a diverter co-operating with said means and rollers to cause the work in said station to be transferred automatically from the second work supporting bed to the first work supporting bed.

38. A mechanism for conveying shoes in racks from one work station to another in the manufacture of the shoes, comprising a first and a second traveling work supporting bed which conjointly conduct the work to and away from each of said stations, said beds being so correlated that the work may be removed from the first bed at a station and may be delivered to the second bed at said station and when so delivered will be returned automatically to the first bed and carried thereby to the next station.

39. A mechanism for conveying shoes in racks from one work station to another in the manufacture of the shoes, comprising a first and a second traveling work supporting bed, and stops and diverters operatively related to the first bed and second bed, respectively, and positioned in places which correspond with the work stations, said beds, stops and diverters being relatively so positioned that the work may be removed from the first bed at a station and may be delivered to the second bed at said station and when so delivered will be returned automatically to the first bed and carried thereby to the next station.

40. A mechanism for conveying shoes in racks from one work station to another in the manufacture of the shoes, comprising a first and a second traveling work supporting bed, each formed of a series of traveling rollers, stops in operative relationship with the first bed and defining different work places along the length of the conveyor, diverters in operative relationship with the second bed and means to cause axial rotation of the rollers, said diverters and means being arranged with relation to each other and to the beds to form switching stations intermediate the work places, substantially as described, whereby the work may be removed from the first bed at any work place and may be delivered to the second bed at said place and will be delivered thence to the first bed and carried thereby to a succeeding work place.

41. In a conveying mechanism, a conveyor having a plurality of endless traveling conveying beds arranged side by side and each provided with rotatively mounted work-supporting members, the conveyor also having, intermediate its length, a diverter and means for causing rotation of said members, to form a switching station at which the work is transferred automatically from one bed to the other, the conveyor also having a plurality of stops defining different work spaces at places in the length of the conveyor other than at the switching station; conveying means to deliver the work to said conveyor; and conveying means to carry the work away from the conveyor.

42. In a conveying mechanism, a plurality of conveyors each comprising a plurality of traveling work supporting beds arranged side by side and provided with means to switch the work automatically from one bed to the other, and conveying sections connecting said conveyors with each other.

43. In a conveying mechanism, a plurality of conveyors each comprising a plurality of traveling work supporting beds arranged side by side and provided with means to switch the work automatically from one bed to the other, and conveying sections connecting said conveyors with each other, and including an upwardly inclined portion to convey the work to a higher level after it has left one conveyor, a portion to convey the work along the higher level, and a downwardly inclined portion to return the work to the level of the next conveyor.

44. A mechanism for conveying shoes in racks from one work station to another in the manufacture of the shoes, comprising a storage run operatively related to each work station and a conveying run also operatively related to each work station, the storage run having stop means corresponding to the several work stations and the conveying run having means at places corresponding to the several work stations to cause the transfer of racks placed thereon to a storage run at a place in advance of a stop on the latter.

45. In a conveyor system for handling shoes in racks between work stations arranged along the length of the system, the said system comprising a series of conveying elements arranged to discharge from one to another and to form a continuous circuit from a place of beginning back to said place of beginning, and including stops disposed along the length of the system at places corresponding to work stations and means operatively related to the several work stations and by which the work is fed from the several work stations to positions to be engaged by the stops.

46. In a conveyor system for handling shoes in racks between work stations arranged along the length of the system and through a dryer arranged intermediate certain of the work stations, the said system comprising a plurality of conveyors, each having an endless traveling conveying line and provided with stops at places along its length corresponding to work stations, each of said conveyors also having a second traveling conveying line and means to cause work to be transferred from the second line to the first line at places intermediate said stops, and conveying means to connect the said conveyors with each other, including a section which traverses a dryer.

47. In a conveyor system for handling shoes in racks between work stations arranged along the length of the system and through a dryer arranged intermediate certain of the work stations, the said system comprising a series of conveying elements arranged to discharge from one to another and to form a continuous circuit from a place of beginning back to said place of beginning, and including conveying elements which traverse the work stations and are provided with stops arranged along the lengths thereof at places corresponding to work stations and with means to feed the work from the several work stations into positions to be engaged by the stops, the system also including a conveying element arranged at a higher level than the work stations and which traverses a dryer and conveying elements to connect opposite ends of the elevated conveying element with conveying elements which traverse the work stations.

48. Mechanism for conveying shoes in racks to and between a series of work stations at which successive operations are performed in the manufacture of the shoes, comprising a conveying means having two rack-supporting beds travelling in the same direction and one beside the other and operating alternately in the conveyance of the racks at places adjacent each of the work stations, and a series of stops arranged at the respective stations in the path of the racks successively brought to said stations by the conveying means.

49. Mechanism for conveying shoes to and between a series of work stations at which successive operations are performed in the manufacture of the shoes, comprising a conveying means having two rack-supporting beds travelling in the same direction and one beside the other at each of said stations, removable shoe racks each of which is moved across one of the beds at each work station, the said beds operating alternately in the conveyance of each rack at the place adjacent each work station, and a stop at each work station to arrest the movement of the racks thereat.

50. Mechanism for conveying shoes in racks to and between a series of work stations at which successive operations are performed in the manufacture of the shoes, comprising an endless travelling conveying means having a rack-supporting bed composed of axially rotative members, means spaced at intervals corresponding to the work stations and operative upon the rotative members to cause them to rotate axially at said intervals in their forward travel, correspondingly spaced diverters co-operating with the axially rotating and forwardly moving members to cause the shoe racks to be discharged from the bed over the side of the latter at the work stations, and means to receive the racks so discharged from said bed.

51. Mechanism for conveying shoes in racks to and between a series of work stations at which successive operations are performed in the manufacture of the shoes, comprising an endless travelling conveying means having a rack-supporting bed composed of axially rotative members, means spaced at intervals corresponding to the work stations and operative upon the rotative members to cause them to rotate axially at said intervals in their forward travel, correspondingly spaced diverters co-operating with the axially rotating and forwardly moving members to cause the shoe racks to be discharged from the bed over the side of the latter at the work stations, and a line of rollers at each work station to receive the racks so discharged from said bed.

52. A mechanism for conveying shoes in racks to and between a series of work stations at which successive operations are performed in the manufacture of the shoes, comprising an endless travelling conveying means having a plurality of rack-supporting beds arranged side by side and travelling in the same direction past each of said stations, a series of stops operatively related to said conveying means and at places corresponding to the positions of the working stations alongside the conveying means and means operatively related to said beds to cause the racks on one bed to be successively transferred over the side of said bed and onto the other bed at places intermediate successive stops.

53. The combination with a plurality of successively arranged work stations, of mechanism comprising endless travelling conveyor and carries co-operating to transfer partially completed shoes to and between said work stations, said conveyor having means forming a first and a second endless travelling bed arranged side by side in substantial parallelism with each other at each work station and each adapted to move the carriers, and said carriers being removable from the first bed and across the second bed at a point adjacent a work station, and placeable upon said second bed; means between the stations co-operating with the second bed to automatically transfer the carriers from the second bed to the first bed at a place between successive stations; and stops spaced apart along the length of the conveyor at places corresponding to the respective work stations and arranged in the path of the carirers on the conveyor.

54. A system for handling shoes in racks in the process of manufacturing the shoes, comprising conveying means including endless travelling conveyors having a plurality of rack-supporting beds travelling side by side past a series of stations at which successive operations are performed in the manufacture of the shoes, a housing through which a portion of the conveying means intermediate the length of the latter extends, and a series of stops spaced along the uncovered portions of the conveying means at places corresponding to the work stations.

55. A system for handling shoes in racks in the process of manufacturing the shoes, comprising conveying means including at one part of the system a double line of uncovered rack-supporting beds which travel in the same direction and one beside the other, and at another part of the system a similar double line of uncovered rack-supporting beds which travel in the same direction and one beside the other, and at another part of the system, intermediate said double lines, a single line of conveyor which traverses a housing and one of whose ends receives the racks from a bed of one double line and the other of whose ends delivers the racks to a bed of the other double line, a series of stops spaced along the length of one double line of rack-supporting beds, a second series of stops spaced along the length of the other double line of beds, the said stops being mounted at places corresponding to work stations positioned along the uncovered portions of the conveying means in the path of the racks successively brought to said stations by the conveying means and said beds of each double line serving alternately in the conveyance of the racks at places adjacent said stations.

In testimony whereof we affix our signatures.

MORRIS U. BURNHAM.
GEORGE M. ARGABRITE.
ARTHUR A. DIONNE.